(No Model.)

S. A. D. HEATH.
SAFETY COCK FOR AIR BRAKES AND SIGNALS.

No. 513,505.　　　　　　　　　　Patented Jan. 30, 1894.

WITNESSES:
Lewis E. Flanders
Lois Moulton.

INVENTOR
Stephen A. D. Heath
BY
Luther V. Moulton
ATTORNEY.

THE NATIONAL LITHOGRAPHING COMPANY,
WASHINGTON, D. C.

UNITED STATES PATENT OFFICE.

STEPHEN A. D. HEATH, OF BIG RAPIDS, MICHIGAN.

SAFETY-COCK FOR AIR BRAKES AND SIGNALS.

SPECIFICATION forming part of Letters Patent No. 513,505, dated January 30, 1894.

Application filed November 9, 1893. Serial No. 490,491. (No model.)

*To all whom it may concern:*

Be it known that I, STEPHEN A. D. HEATH, a citizen of the United States, residing at Big Rapids, in the county of Mecosta and State of Michigan, have invented certain new and useful Improvements in Safety-Cocks for Air Brakes and Signals; and I do hereby declare the following to be a full, clear, and exact description of the invention, such as will enable others skilled in the art to which it appertains to make and use the same.

My invention relates to an improved safety cock for air brakes and signals used on railway trains, and its object is to provide the same with certain new and useful features hereinafter more fully described and particularly pointed out in the claims, reference being had to the accompanying drawings, in which—

Figure 1:
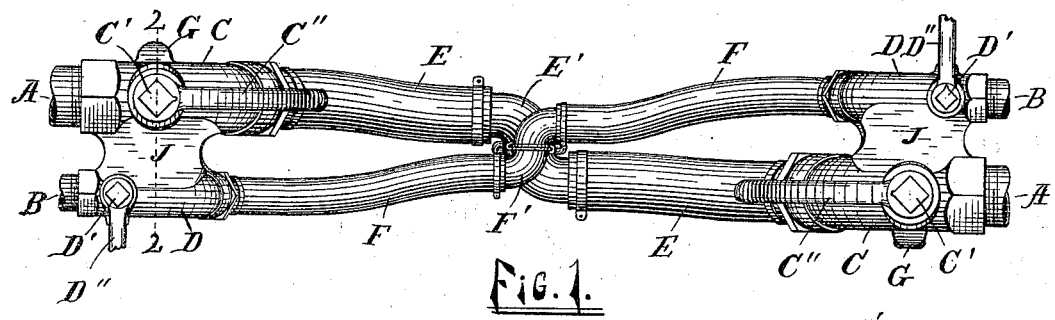
Figure 2:
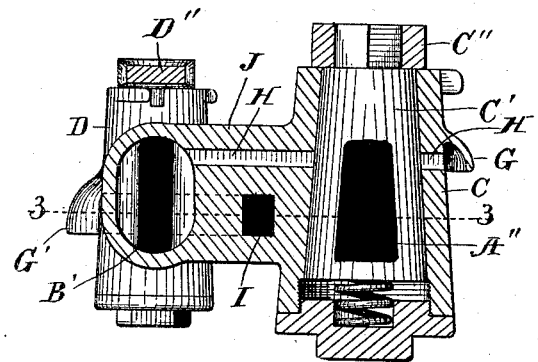
Figure 3:
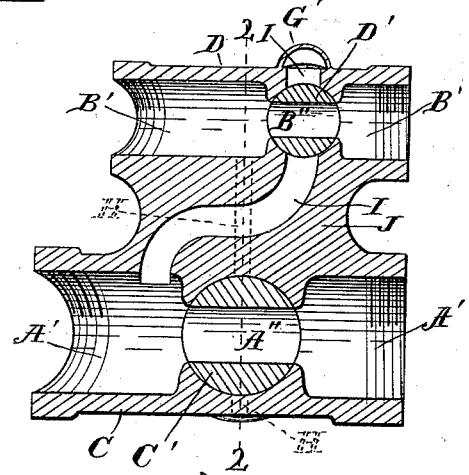

Figure 1 represents a plan view of a device embodying my invention; Fig. 2 an enlarged vertical section of the same on the line 2—2 of Figs. 1 and 3; and, Fig. 3 a horizontal section of the same on the line 3—3 of Fig. 2.

Like letters refer to like parts in all of the figures.

A represents the line of pipe containing air to operate the brakes; B the line of pipe containing air to operate the signal in the cab; said pipes are arranged and connected to the necessary apparatus to constitute a brake and signal system as commonly constructed.

C, C, and D, D, represent angle cocks for the respective pipe lines at the respective ends of adjacent coaches and connected by separate flexible sections of hose E, E, and F, F, coupled at the middle by the detachable couplings E', F'. Through these cocks C, D, are the passages A', B', transversely intersected by rotative plugs having passages A'', B'', which plugs are rotated by the levers C'', D'', to open or close the respective air passages A', B'.

So far the described device is old and well known. The features of novelty consist in providing said adjacent cocks C and D, with a connecting intermediate portion or block J, and lateral ports or passages H, I, therethrough, and extending the same outward through the respective outer walls of the said cocks, whereby as the air in one line is shut off by turning the plug in the same, the air in the other line is allowed to escape; for this purpose said port I extends from the outer channel A' in the cock C through the interior of the block J to the chamber, containing the plug D' in the signal line, and thence from said chamber to the outer air whereby when said plug is turned to close the signal line B, the air will escape therethrough from the brake line A; and the port H in like manner extends from the outer chamber B' in the cock D through the block J to the chamber containing the plug C', and from thence outward to the open air whereby as said plug is turned to cut off the brake line A the air is permitted to escape from the signal line. Hoods G and G' project outward and downward over the outer openings of said ports H and I, which deflect the air current downward and prevent snow, dust, dirt, or other obstructions from accumulating in the outer ends of said ports.

From the foregoing the operation of my device will be readily understood. Should any one turn off the cock C, thus closing and disabling the brake circuit; the escape of air from the other line would sound the signal and notify the engineer. Should the cock D be turned off, thus closing the signal line and disabling the same, the escape of air from the other line would at once set the brakes and thus notify the engineer, or stop the train, if running. These operations will readily be seen to be great safeguards against accident, either in coupling, uncoupling, or running of trains. Furthermore when uncoupling cars having this device attached as all four of the cocks shown in Fig. 1 are turned off the air in all of the hose sections is exhausted before uncoupling the same, which renders such uncoupling less difficult by removing the pressure and consequent friction on the couplings E', F' and also prevents the wear on the same due to such friction.

What I claim is—

1. In combination with the air pipe lines of a brake system and signal system, having stop cocks therein, lateral ports connecting the cock in one line with the interior of the other line, substantially as described.

2. In combination with stop cocks in an air brake line, and air operated signal line, a block connecting said cocks and lateral ports extending from the interior of each line to the respective plug chambers in the other line and thence outward to the open air, substantially as described.

3. In combination with the air brake line and the air signal line of a railway train, a stop cock in the brake line and a lateral port from said cock to the interior of the signal line, whereby as the brake line is closed the signal line is operated, substantially as described.

4. In combination with the air brake line and the air signal line of a railway train, a stop cock in the signal line, and a lateral port from said cock to the interior of the brake line, whereby as the signal line is closed the brake line is opened, substantially as described.

5. In combination with the air brake line and the air signal line of a railway train, a stop cock in one of said lines and a port extending from said stop cock to the interior of the other of said lines whereby as one line is closed the other is opened, substantially as described.

6. In combination with the air brake line and the air signal line of a railway car, a stop cock in each of said lines, an integral middle block, or portion connecting said cocks, a port extending from the outer end of each to the plug chamber of the other of said cocks, and a continuation of each of said ports from said plug chambers to the open air, and hoods over the outer ends of said ports, substantially as described.

In testimony whereof I affix my signature in presence of two witnesses.

STEPHEN A. D. HEATH.

Witnesses:
LUTHER V. MOULTON,
L. E. FLANDERS.